J. HARRIS.
Bee Hive.

No. 2,929.　　　　　　　　　　　　　　Patented Jan. 27, 1843.

UNITED STATES PATENT OFFICE.

JOSEPH HARRIS, OF BELMONT COUNTY, OHIO, ASSIGNOR TO WESLEY McCOY, OF ST. CLAIRSVILLE, OHIO.

BEEHIVE.

Specification of Letters Patent No. 2,929, dated January 27, 1843.

*To all whom it may concern:*

Be it known that I, JOSEPH HARRIS, of Belmont county, State of Ohio, have invented a new and Improved Beehive Preservative to Prevent Vermin from Entering or Doing Injury to Hives of Bees.

Figure 1:
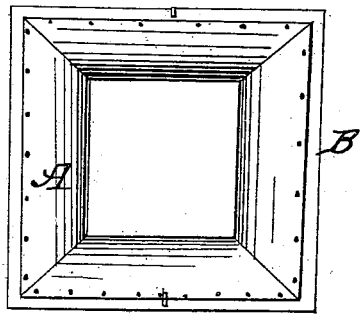
Figure 2:
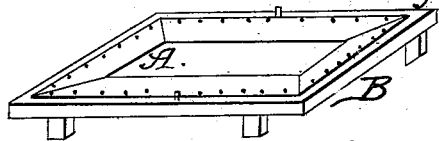
Figure 3:
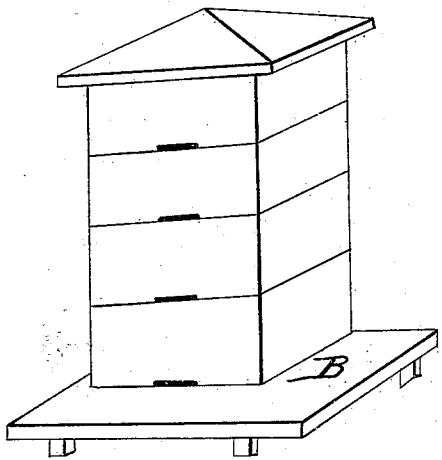

Figure 1 in the drawing is a top plan; Fig. 2, perspective view; Fig. 3, hive complete.

The nature of my invention consists in placing a strip of tin, or any other substance, polished smooth and being about three inches broad, in form of an inclined plane A sloping downward at an angle of about 30° all around the inner edge of the pedestal B, on which the bee-hive is to be placed, so that when the hive is put on the pedestal, this polished plate will project downward inside the hive, immediately below the door, or entrance, so that when the butterfly goes in, it will descend below the projecting polished plate, and deposit its eggs there, and the worms that are hatched therefrom, being unable to crawl up over the smooth inclined plane, can not enter the hive. It is known that the fly that is most injurious to hives will not fly up where the bees are at work, inside the hive, perhaps from the opposition which the bees make to all such intruders, but they deposit their eggs at bottom of the hive, and the worm crawls up to eat of the honey. This smooth inclined plane therefore forms a barrier over which they cannot ascend, and if by chance a butterfly should succeed in depositing eggs above it, the worms produced thereby will be thrown out by the bees, and will fall on this inclined plane, and roll off, and be unable to get up over the inclined plane into the hive.

This simple contrivance will defend the hive from all kinds of vermin that infest the apiary.

What I claim as my invention, and desire to secure by Letters Patent is—

The application of a polished plate placed in form of an inclined plane as above described to every kind of bee-hive.

JOSEPH HARRIS.

Witnesses:
MILTON MILLER,
HEMAN MEAD.